Nov. 19, 1940.  G. A. TINNERMAN  2,222,449

FASTENING DEVICE

Filed Jan. 7, 1937

INVENTOR.

GEORGE A. TINNERMAN

BY Bates, Gohrick, & Teare

ATTORNEYS

Patented Nov. 19, 1940

2,222,449

UNITED STATES PATENT OFFICE 2,222,449

FASTENING DEVICE

George A. Tinnerman, Rocky River, Ohio, assignor, by mesne assignments, to Tinnerman Products, Inc., Cleveland, Ohio, a corporation of Ohio Application January 7, 1937, Serial No. 119,415

11 Claims. (Cl. 85—32)

This invention relates to threadless fasteners, and particularly to those which are adapted to be used in an assembly wherein it is necessary for the fastener to retain itself in bolt receiving position prior to the insertion of the bolt. Previous forms of fastening devices of this nature have not provided any means for closing the aperture through which the fastener has been inserted, and where such fasteners have been used, for example, in connection with the assembly of an automobile body, the opening enabled water and other foreign matter to enter the body. Similar conditions have existed in refrigerator cabinets, where it is essential that the insulation carrying compartments be sealed against the entrance of moisture, and in railway cars, airplanes, steel tanks, furnaces and associated types of products.

Figure 5:
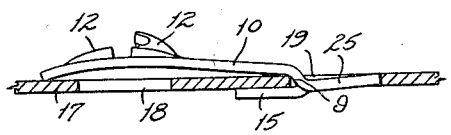

The instant invention marks certain improvements over the general combination shown in Fig. 5 (and claimed), in my copending application Serial Number 111,653, the original of which was filed May 8, 1936, and since issued as Patent 2,084,926, June 22, 1937. The present application deals, more particularly, with added features of construction whereby the opening through which the fastener is applied is substantially sealed against the entrance of moisture or foreign matter in a completed assembly.

An object of the present invention, therefore, is to make a threadless fastener, which possesses adequate power for holding either a threaded member, or any other article, and which at the same time, will have such relation to the opening through which the fastener is inserted that it will be held rigidly in article receiving position, and will automatically seal the opening through which the fastener was inserted, against the entrance of moisture or foreign material.

Figure 1:
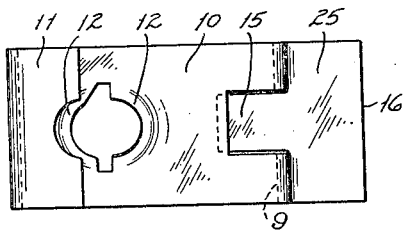
Figure 3:
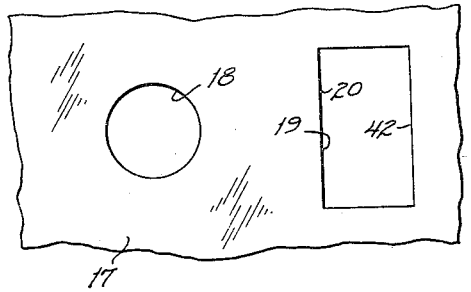
Figure 2:
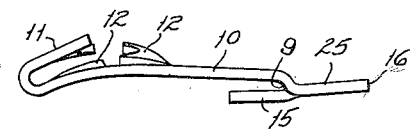
Figure 4:
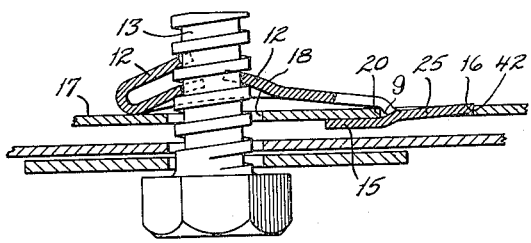

This invention is shown in various forms in the drawing, wherein Fig. 1 is a top plan view of one form of the invention; Fig. 2 is a side view of the fastener that is shown in Fig. 1; Fig. 3 is a top plan of an article having openings therein for receiving the fastener, and for receiving a threaded member with which the fastener is intended to be used; Fig. 4 is a vertical section taken through a plurality of parts that are joined together by means of a fastener embodying my invention, and Figs. 5 to 11 inclusive, are sectional views taken through an article to be joined, and having modified forms of fastener that are included within the scope of my invention.

The fastener which is illustrated in Figs. 1, 2 and 4 has a body portion 10, one end of which is bent upwardly and backwardly upon itself, as at 11, and which cooperates with tongues 12 to provide a bolt-receiving portion for engaging a multiple turn on the shank of a threaded member 13. To hold the fastener in bolt-receiving position upon a part to be joined, I provide a clip at the end opposite the turned-up portion 11 and I prefer to form the clip out of the material which comprises the body of the fastener. In the form illustrated in Fig. 1, the clip embodies a tongue 15 which is stamped downwardly from the fastener body at a point spaced inwardly from the end 16 thereof, and sufficiently far to engage the underside of one of the parts to be joined.

The engagement between the top and bottom sides of a part to be joined is illustrated in Fig. 4 wherein 17 represents a plate having a bolt-receiving aperture 18 therein and a fastener receiving aperture 19 therein. The line of connection between the tongue 15 and the body of the fastener is spaced sufficiently far from the end of the fastener, that when the edge 20 of the opening 19 engages the crotch or shoulder 9 between the tongue 15 and the fastener body, the bolt receiving aperture on the fastener will be in registration with the bolt opening 18 on the part 17.

To admit the fastener illustrated in Fig. 1, the opening 19, on the part 17, has one dimension which is substantially the same as the width of the fastener body and with just enough clearance to admit the fastener readily, while the opposite dimension is sufficient to permit endwise movement of the fastener readily during the assembly operation. When the crotch on the fastener is in engagement with the edge 20, however, part of the opening 19 would normally remain unsealed, and whenever the fastener is used for assembling the fender on an automobile body, the unsealed part would permit the entrance of water, exhaust vapors, dirt and foreign matter into the body. To conceal such opening, therefore, I provide on the fastener body an extension 25 which fits snugly within the opening after the fastener has been inserted into place. By utilizing a close-fit between the extension and the walls of the opening 19, the end 16 of the extension can be snapped into the opening as the final act in the assembly operation. Thereupon, the fastener is securely held in bolt-receiving position, and at the same time the opening through which the fastener is inserted is adequately sealed.

Figure 9:
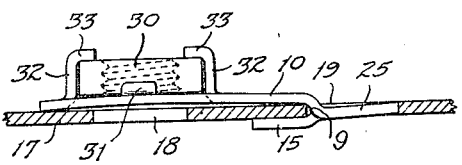
Figure 10:
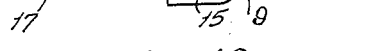
Figure 7:
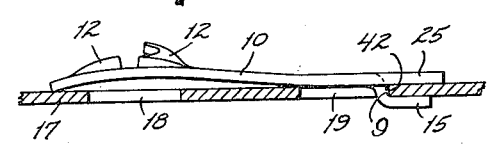

In the modifications illustrated in Figs. 5, 9 and 10 the positioning and sealing parts of the fastener are illustrated as being substantially the same as those used on the fastener illustrated in Fig. 1, but that portion which engages either a threaded member or article is modified. For example, in Fig. 5, the tongue 11 is eliminated as a result of which a bolt-thread is engaged by the fastener only on one turn of the thread. In Fig. 9, the fastener is formed to receive a standard square nut indicated at 30, the formation embodying lugs 31, which extend upwardly from the body of the fastener and engage the nut on two of its opposite sides, and lugs 32 which extend upwardly from the body of the fastener and engage the nut on the two remaining sides. In the preferred arrangement, the lugs 32 are longer than the depth of the nut, whereby the projecting ends thereof are adapted to be bent inwardly to form flanges 33, which engage the top of the nut. The lugs 31 and 32 may be formed by stamping metal from the body of the fastener.

The fastener illustrated in Fig. 10 may be utilized for holding a conduit or other article, such as that indicated at 35 in which a portion of the body of the fastener is bent upwardly, thence backwardly and downwardly, and again upwardly, to provide a yieldable arm 36 which cooperates with the body to receive and hold the conduit. In this illustration, as well as in those of Figs. 5 and 9, the parts which correspond to those illustrated in Fig. 1 have the same reference characters.

Figure 6:
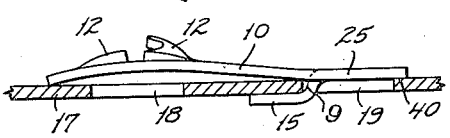
Figure 11:
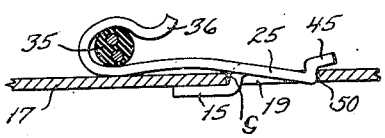
Figure 8:
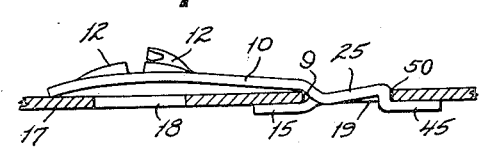

The modification shown in Figs. 6, 7, 8 and 11 may have the article receiving part formed as shown in any manner previously described, but the positioning and sealing portions may be varied as follows: In Fig. 6 the extension 25 projects across the opening and overlaps the article, as indicated at 40, the positioning being accomplished by a relatively tight fit between the body of the fastener and the tongue 15; in Fig. 7, the tongue 15, as well as the extension 25 engage opposite faces of the article 17 along the edge 42 of the opening 19 that is remote from the article receiving end of the fastener. In this case, the tongue 15 extends in the same general direction as the extension, instead of the opposite direction, as is illustrated in Fig. 6; in Fig. 8, the tongue 15 is similar in arrangement to that shown in Fig. 5, and the sealing part is likewise similar, except for the fact that it has an offset portion 45 which is adapted to engage the underside of the article 17; in Fig. 11 the positioning and sealing part is similar to that shown in Fig. 8, except for the fact that the offset occurs on that portion which is adapted to engage the top side of the part 17. In Figs. 8 and 11, the extension 25 has a shoulder 50, adjacent the offset 45, which cooperates with the shoulder 9 to lock the fastener securely within the aperture 19.

An advantage of a fastener which is made in accordance with my invention is the fact that it is self-sustaining in bolt, or article, receiving position, and that it may be easily manufacured by relatively simple tools. A further advantage is the fact that when the fastener is used in those locations where the assembly opening must be sealed, the closure or sealing is effected automatically by that portion of the fastener which is used for locking it into bolt or article receiving position.

I claim:

1. The combination of a support provided with a bolt passage and an assembling slot, a part to be connected to said support and a one-piece connecting device comprising a pair of members, one of which is provided with bolt receiving means deformed therefrom and is applicable through the assembling slot from one side of the support to be positioned on the opposite side thereof, with the bolt receiving means overlying the bolt passage and in position to receive a bolt fastening to connect said part to the support, and said device having a portion thereof sealing the assembling slot when the device is in bolt receiving position on said support.

2. In combination with a support provided with an assembling opening, a fastening device comprising a body including an extension and a tongue element, said tongue element and body cooperating to engage opposite faces of the support through said assembling opening with said extension substantially sealing said opening and extending in the same general direction as the body to be disposed in close relation to the support in the applied fastening position of the device, said body comprising bolt receiving means out of line with said opening for receiving a bolt fastening in securing an object relative to the support.

3. The combination of a support provided with a bolt passage and an assembling slot, a part to be connected to said support, and a connecting device comprising a body member carrying bolt engaging means, a tongue and an extension, said body member being applicable through the assembling slot from one side of the support to be positioned on the opposite side thereof with the bolt engaging means overlying the bolt passage and in position to receive a bolt fastening to connect said part to the support, said body member and tongue cooperating to engage said support through said assembling slot in maintaining the connecting device in applied position on the support, said extension substantially sealing the slot in such applied fastening position of the connecting device.

4. The combination of a support provided with a bolt passage and an assembling slot, a part to be connected to said support, and a connecting device comprising a body member carrying bolt engaging means and including an extension and a tongue element struck therefrom, said body member being applicable through the assembling slot from one side of the support to be positioned on the opposite side thereof with the bolt engaging means overlying the bolt passage and in position to receive a bolt fastening to connect said part to the support, said body member and tongue cooperating to engage opposite faces of the support in maintaining the connecting device in applied position on the support with said extension substantially sealing the slot in the applied fastening position of the connecting device.

5. In combination with a support provided with an assembling opening, a fastening device comprising a body including an extension and tongue element, said tongue element and body cooperating to engage said support through said assembling opening with said extension substantially sealing said opening in the applied fastening position of the device, said body comprising bolt receiving means out of line with said opening for receiving a bolt fastening in securing an object relative to the support.

6. In combination with a support provided with an assembling opening, a fastening device comprising a body including an extension and tongue element, said tongue element and body cooperating to engage said support through said assembling opening with said extension substantially sealing said opening in the applied fastening position of the device, said body comprising integral bolt engaging means deformed therefrom out of line with said opening for receiving a bolt fastening in securing an object relative to the support.

7. In combination with a support provided with an assembling opening, a sheet metal fastening device comprising a body including an extension and a tongue element struck out of the plane of said body to extend in spaced relation thereto, said tongue element and body cooperating to engage said support through said assembling opening with said extension substantially sealing said opening in the applied fastening position of the device, said body comprising integral bolt engaging means deformed therefrom out of line with said opening for receiving a bolt fastening in securing an object relative to the support.

8. A nut including integral means to secure it to a structure, said means consisting of an elongated strip of sheet metal carrying the nut and formed to pass through a perforation in said structure from one side thereof, and portions offset from said strip and disposed adjacent an end thereof, said portions extending in opposite directions from said end and formed to contact with said side of said structure at opposite sides of said perforation.

9. A sheet metal nut and nut securing means comprising a sheet metal element having an elongated part provided with a split conical protuberance having an opening for the passage of a threaded element, the wall of said opening providing a helical thread, said part providing a tongue for passage through a perforation in a structure to which the nut is to be secured, and portions of said sheet metal element extending in opposite directions from one end of said part and in parallelism thereto to underlie said structure at opposite sides of said perforation.

10. A sheet metal structure ready for the reception of a screw having a hole for the passage of a clip providing the threads for said screw, and a perforation for the passage of the screw, said clip having an elongated tongue passed through said hole and overlying said structure at said perforation and carrying said threads, portions underlying said structure forwardly and rearwardly of said hole, and stops projecting upwardly into said hole and engaging a wall thereof to position said clip with respect to said structure.

11. A sheet metal structure ready for the reception of a screw having a hole for the passage of a clip providing the threads for the said screw, and a perforation for the passage of the screw, said clip having an elongated tongue passed through said hole and overlying said structure and said perforation and having its end turned back over the body of said tongue, openings having threads formed adjacent thereto in the body and turned back portion of said tongue, portions underlying said structure forwardly and rearwardly of said hole, and stops projecting upwardly into said hole and engaging a wall thereof to position said clip with respect to said structure.

GEORGE A. TINNERMAN.